UNITED STATES PATENT OFFICE 2,022,383

CELLULOSE DERIVATIVE COMPOSITION

William Henry Moss, London, England, assignor to Celanese Corporation of America, a corporation of Delaware No Drawing. Application February 23, 1933, Serial No. 658,152. In Great Britain March 15, 1932

3 Claims. (Cl. 106—40)

This invention relates to improvements in the manufacture of compositions of matter, and particularly to plastic and moulding compositions containing cellulose derivatives and synthetic resins.

It has been found that compositions of matter which are highly valuable as moulding powders and as plastic compositions in general may be prepared by incorporating together synthetic resins and cellulose derivatives, the synthetic resin being present in a quantity at least equal to the cellulose derivative. The present invention comprises, therefore, compositions of matter containing cellulose derivatives and synthetic resins, the synthetic resin being present in a proportion equal to or greater than the cellulose derivative, and includes also their production. Other materials may of course also be present in the compositions, for example plasticisers, filling materials, colouring materials and any other suitable substances.

The invention comprises broadly the use of any synthetic resins in combination with cellulose derivatives. Examples of synthetic resins which may be employed are the aryl sulphonamide-aldehyde resins, e. g. the para toluene sulphonamide-formaldehyde resins, those obtainable from furfural and aniline, polymerized vinyl compounds and the type yielded by the condensation of phenoxy-acetone. Again, resins obtained by the condensation of phenols with other compounds may be used, amongst which may be mentioned the resinous condensation products of formaldehyde, furfural and other aldehydes with diphenylol propane and other phenol-ketone products, and of phenols with chloracetone, furfural, allyl compounds and sulphur chloride. The phenolic resins obtained from phenols and ketones, phenols and aldehydes, or phenols, aldehydes and ketones, such as, for example, diphenylol propane-formaldehyde resin and phenol-formaldehyde resin, especially when prepared in the presence of acid catalysts, have been found particularly suitable. Suitable methods for the production of the diphenyl propane-formaldehyde resin are described in U. S. Patent No. 1,848,644.

We have found that the diphenylol-propane-formaldehyde type of resin, alone or in admixture with phenol-aldehyde resins, is particularly adapted for use in accordance with the invention both because of a high degree of compatibility with cellulose derivatives and because of the very quick moulding properties of the compositions.

As stated above, the synthetic resins are used in proportions of 100% or over on the cellulose derivative present, and it has been found that their use in considerably greater proportions, as for example up to 9 and even more times the weight of the cellulose derivative present, is particularly advantageous.

While the invention is particularly applicable to the production of compositions containing cellulose acetate, yet other cellulose derivatives may also be employed, as for example cellulose nitrate, other organic esters of cellulose, e. g. cellulose formate, propionate and butyrate, ethers of cellulose, such as methyl, ethyl, butyl and benzyl cellulose, mixed esters and mixed ethers, for example cellulose nitro-acetate, and ether-esters of cellulose.

The proportion of filling material employed may of course be varied in accordance with the particular type of composition which it is desired to produce, but in general it has been found that proportions of from 800 to 1200% on the weight of the cellulose derivative are very suitable. Any suitable filling materials may be employed, as, for example, inorganic materials such as carbon black, iron oxide, silica, barium sulphate and talc, or organic filling materials. The use of bentonite or china clay has been found particularly advantageous. Mixtures of two or more of these filling materials may of course be employed.

The plastic composition may, and preferably will, contain a certain proportion of plasticizer, and in this case also the quantity used will, of course, depend upon the conditions of moulding and the product which it is desired to obtain. It may, however, be mentioned that broadly proportions of plasticizer of from 200 to 600% on the cellulose derivative, or of from 25% to 100% on the combined cellulose derivative and synthetic resin, appear to yield good results. Triacetin has been found very suitable for use according to the present invention, but other plasticizers may of course be employed, as for example diethyl and dibutyl phthalate and tartrate, tricresyl phosphate and triphenyl phosphate, aromatic sulphonamides and their mono- and dialkyl derivatives, such as ethyl toluene sulphonamide and camphor.

The incorporation of the cellulose derivative with the synthetic resin and with any other constituents which may be present may be carried out in any suitable manner. Thus the cellulose derivative and the synthetic resin, preferably already in a fine state of subdivision, may be ground together in a suitable apparatus, for example a ball or colloid mill, until an intimate admixture is obtained. Filling material and/or plasticizer may, if desired, be incorporated simultaneously with this grinding process or previously or subsequently. Again, a composition containing the cellulose derivative and the plasticizer obtained by any suitable method may be ground with the synthetic resin and, if desired, a filler or any modification or combination of these methods may be employed. Alternatively, any one or more of the constituents may be dissolved or suspended either separately or together in a suitable medium or media, preferably relatively volatile, the remaining constituent or constituents incorporated in the solution or suspension and the medium finally removed by evaporation or in any other suitable manner. If desired and convenient all of the constituents may be dissolved in the same or different solvents, which may then if necessary be admixed, the solvent being then removed to give the final product. Another method comprises the addition to a solution or dispersion containing two or more of the constituents of a suitable reagent which will precipitate them, the precipitate being then separated, if necessary washed, and dried. This process may, if desired, be modified by using solvents for the separate constituents such that when the solvent mixtures are combined, the constituents are precipitated from the mixture. The addition of another reagent is thus avoided. A composition obtained by any of the above methods may of course be further ground in any suitable apparatus if desired.

The compositions of matter obtained according to the present invention are very suitable for use as plastic compositions and moulding powders and in the production of moulded articles generally, and their application in the manufacture of gramophone records has been found particularly advantageous.

Whilst such plastic compositions may be prepared by a number of alternative methods, the following examples constitute three convenient ways of preparing a moulding powder in accordance with the present invention. These are given for the sake of illustration only, and the invention is not to be regarded as limited to the ingredients or exact proportions mentioned therein, or to the methods employed for mixing such ingredients.

*Example 1*

A moulding powder is made up from the following ingredients, in the following proportions:—

| | Parts |
|---|---|
| Cellulose acetate | 100 |
| Diphenylol propane formaldehyde resin | 100–200 |

The above mixture is ground up in a ball mill until a suitable degree of fineness, conveniently 40 mesh, is attained.

*Example 2*

A moulding powder is made up as follows:—

| | Parts |
|---|---|
| Cellulose acetate | 100 |
| Diphenylol propane formaldehyde resin | 140 |
| Diphenylol propane acetone resin | 30 |

These ingredients are intimately mixed in a ball mill as in Example 1 above.

*Example 3*

A mixture is made up of the following:—

| | Parts |
|---|---|
| Cellulose acetate | 18.6 |
| Triacetin | 74 |
| Diphenylol propane formaldehyde resin | 63 |
| Phenol formaldehyde resin (acid catalyst) | 63 |
| China clay filler | 170 |

The cellulose acetate is dissolved in the triacetin plasticizer with the aid of heat. To this mixture the resins are added and the mass heated and agitated until a uniform solution results. The china clay filler is then stirred in until a homogeneous mass is obtained, which is cooled to solidify and then ground, conveniently in a ball mill, to a suitable degree of fineness for use as a moulding powder.

What I claim and desire to secure by Letters Patent is:—

1. A molding powder comprising cellulose acetate in admixture with at least its own weight of a synthetic resin consisting substantially of a diphenylol propane formaldehyde resin, the cellulose acetate and synthetic resin together constituting the major portion of the plasticizable constituents.

2. A molding powder comprising cellulose acetate in admixture with at least its own weight of a synthetic resin consisting substantially of a diphenylol propane formaldehyde resin, and with china clay in an amount equal to about 8–$\frac{1}{12}$ times the weight of the cellulose acetate, the cellulose acetate and synthetic resin together constituting the major portion of the plasticizable constituents.

3. A molding powder comprising a derivative of cellulose selected from the group consisting of organic acid esters of cellulose and cellulose ethers in admixture with at least its own weight of a synthetic resin consisting substantially of a phenol-ketone resin, the said composition being substantially free from other plasticizable constituents.

WILLIAM HENRY MOSS.

CERTIFICATE OF CORRECTION

Patent No. 2,022,383.

November 26, 1935.

WILLIAM HENRY MOSS.

It is hereby certified that error appears in the printed specification of the above numbered patent requiring correction as follows: Page 2, second column, line 46, claim 2, for "8-1/12" read 8-12; and that the said Letters Patent should be read with this correction therein that the same may conform to the record of the case in the Patent Office.

Signed and sealed this 7th day of January, A. D. 1936.

(Seal)

Leslie Frazer
Acting Commissioner of Patents.